UNITED STATES PATENT OFFICE.

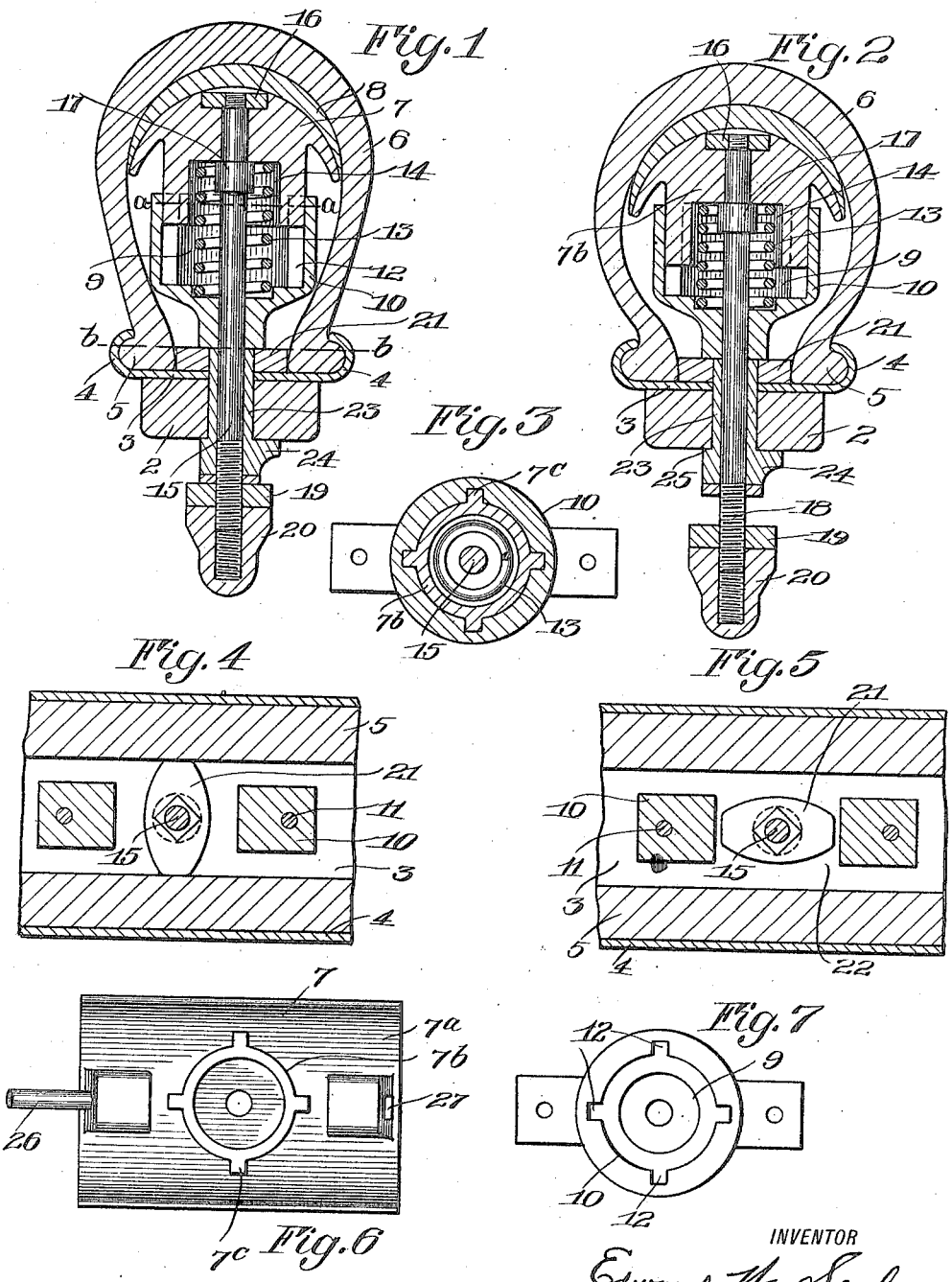

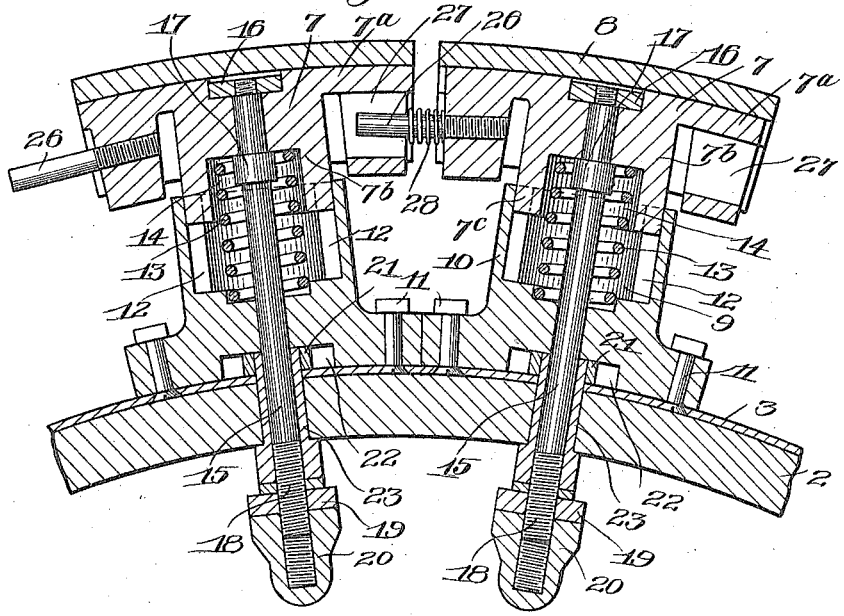
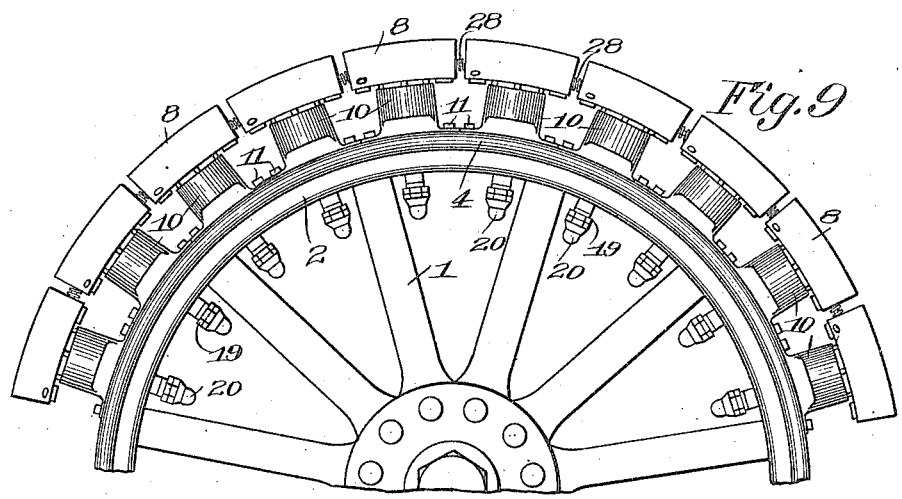

EDWARD W. SEALY, OF ROCHESTER, NEW YORK, ASSIGNOR OF ONE-HALF TO ELIHU T. DAVIS, OF BOSTON, MASSACHUSETTS, AND ONE-SIXTEENTH TO MEYER DAVIS AND SEVEN-SIXTEENTHS TO NINA M. LODER, BOTH OF ROCHESTER, NEW YORK.

VEHICLE-WHEEL.

1,180,612.      Specification of Letters Patent.      Patented Apr. 25, 1916.

Application filed August 7, 1915. Serial No. 44,145.

*To all whom it may concern:*

Be it known that I, EDWARD W. SEALY, of Rochester, in the county of Monroe, State of New York, have invented a new and useful Vehicle-Wheel, which improvement is fully set forth in the following specification and shown in the accompanying drawings.

The present invention relates to vehicle wheels and more particularly to that type in which spring means is employed for holding a rubber casing distended, an object of this invention being to provide a construction in which the spring means may be readily adjusted to correspond with the weight of the vehicle and also may be adjusted to facilitate the removal of the casing from the wheel.

Another object of the invention is to provide a means for the purpose of holding the beads on the casing in firm engagement with the clencher rim against the action of an adjustable resilient means secured to the rim.

To these and other ends the invention consists in certain parts and combinations of parts all of which will be hereinafter described, the novel features being pointed out in the appended claims.

In the drawings: Figure 1 is a transverse sectional view through the rim and tire portions of a wheel; Fig. 2 is a view similar to Fig. 1 showing the wheel under compression; Fig. 3 is a section on the line $a$—$a$, Fig. 1; Fig. 4 is a section on the line $b$—$b$, Fig. 1, showing the manner of locking or holding the casing to the clencher rim; Fig. 5 is a view similar to Fig. 4 showing the locking or holding devices in unlocking position; Fig. 6 is a detail view of one of the plungers; Fig. 7 is a detail view of one of the plunger guides; Fig. 8 is a circumferential section through a portion of the wheel with the casing removed; and Fig. 9 is a side elevation of a portion of the wheel with the casing removed.

Referring more particularly to the drawings, 1 indicates the spokes of the wheel which support the felly 2 on which is secured a clencher rim 3 having inwardly-turned side flanges 4 under which the usual beads 5 of the casing are secured.

Instead of using air for holding the casing distended there is employed a plurality of plungers 7 disposed equidistantly about the wheel and each having a portion $7^a$ covered with leather, rubber or other yielding material 8 conforming to the inner walls of a portion of the casing 6 and bearing against said wall. From the portion $7^a$, a projecting portion $7^b$ extends having radial ribs $7^c$ and operating in pockets 9 formed in guide members or standards 10 which are bolted or otherwise secured at 11 to the clencher rim, the pocket having radial grooves 12 in which the ribs $7^c$ operate to prevent the turning of the plunger. Within each pocket 9, a helical spring 13 is arranged, said spring seating at its inner end against the bottom of the pocket and at its outer end against the bottom of a pocket 14 formed in the projecting portion $7^b$ of the plunger.

In order that the springs 13 may be placed under compression, a rod or stem 15 is secured to the plunger 7 by a nut 16 arranged in a pocket in said plunger and holding the latter against an annular shoulder 17 on the stem or rod. The rod extends through the standard 10 and through the clencher rim and felly, its inner end being provided with a screw-threaded portion 18 engaged by two nuts 19 and 20.

For the purpose of holding the beads 5 beneath the inwardly-turned flanges 4, holding devices 21 are employed each of which is preferably elongated and arranged inward of one of the standards 10, the latter, for this purpose, having a recess 22. This holding device is secured to the outer end of a sleeve 23 which surrounds the stem 15 and extends through the felly 2, its inner end being provided with an operating portion 24 on the inner periphery of the felly 2. The sleeve is provided with a shoulder 25 which prevents the axial movement of the sleeve in the felly.

With the end in view of holding the plungers in resilient relation to each other, each plunger is provided at one side with a projection or pin 26 which extends into a slot 27 in the other side of an adjacent plunger, and about this pin, a helical spring 28 is arranged which seats at its opposite ends against the opposed faces of the two plungers.

In using the invention, the nuts 19 and 20 are operated to compress the springs 13 and the holding devices 21 are turned to the position shown in Fig. 5 after which the beads 5 on the casing may be fitted under or removed from beneath the flanges 4 or the clencher rim. If the casing has been fitted in place on this operation, then the holding devices are turned by the operating members 24 until they occupy the positions shown in Fig. 4 after which the nuts 19 and 20 are turned to distend the casing as shown in Fig. 1.

A vehicle wheel constructed in accordance with this invention makes it possible to use a commercial vehicle casing and to hold the same distended without the use of air or inner tubes. There are no difficulties due to punctures and it is unnecessary to maintain constant watch in order to ascertain whether the casing has become deflated. The casing is easily removed and when in operative position, it is effectively held to the clencher rim. The parts are so constructed that they are inexpensive to manufacture and they are not liable to get out of order.

What I claim as my invention and desire to secure by Letters Patent is:

1. A vehicle wheel comprising a rim having inwardly-turned flanges, a casing having beads along opposite edges received beneath the flanges of the rim, adjustable resilient means secured to the rim and acting to maintain the casing distended, and elongated holding devices rotatably mounted on the rim between the flanges to engage the casing near its edges for holding the beads beneath the flanges.

2. A vehicle wheel comprising a rim having inwardly-turned flanges, a casing having beads along opposite edges received beneath the flanges of the rim, adjustable resilient means secured to the rim and acting to hold the casing distended, and elongated members rotatably mounted on the rim between the flanges for holding the casing beads beneath the flanges, said members having means connected thereto and arranged on the inner periphery of the rim by which the holding members may be operated.

3. A vehicle wheel comprising a rim having inwardly-turned flanges, a casing having beads along opposite edges received beneath the flanges, yielding plungers mounted on the rim and having stems extending through the rim, rotatable sleeves surrounding said stems, operating portions on the sleeves on the inner periphery of the rim and elongated holding members rigid with the sleeves between the rim flanges for holding the casing beads beneath the flanges.

4. A vehicle wheel comprising a rim, radially movable and yieldingly mounted plungers on the rim, each plunger having a projection on one side and a slot on the opposite side receiving the projection of the proximate plunger, and springs surrounding said projections.

EDWARD W. SEALY.

Copies of this patent may be obtained for five cents each, by addressing the "Commissioner of Patents, Washington, D. C."